Nov. 18, 1969         E. H. SCHULTZ, JR         3,478,381
CASTER BRACKET DEVICE
Filed Nov. 7, 1966
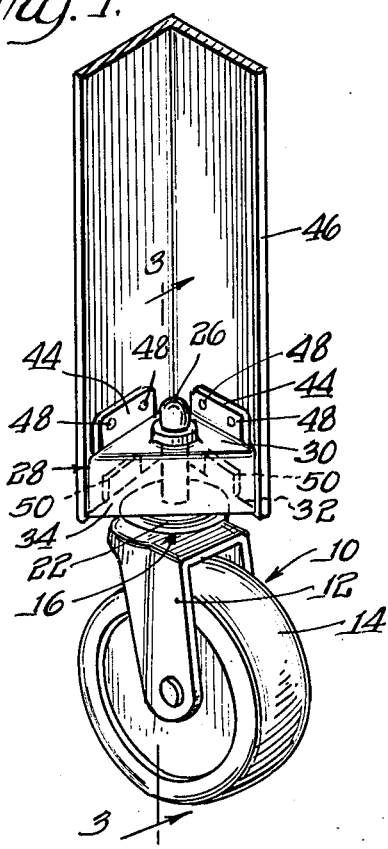
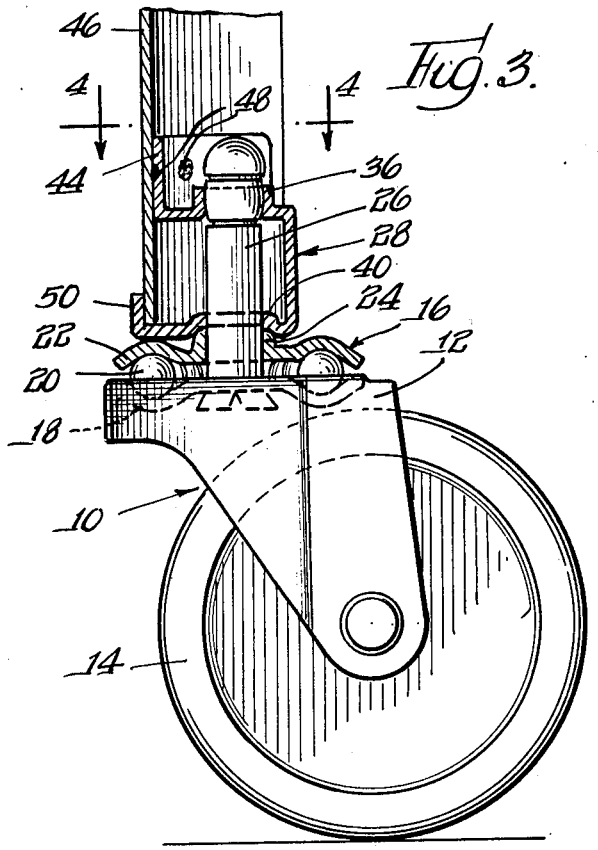
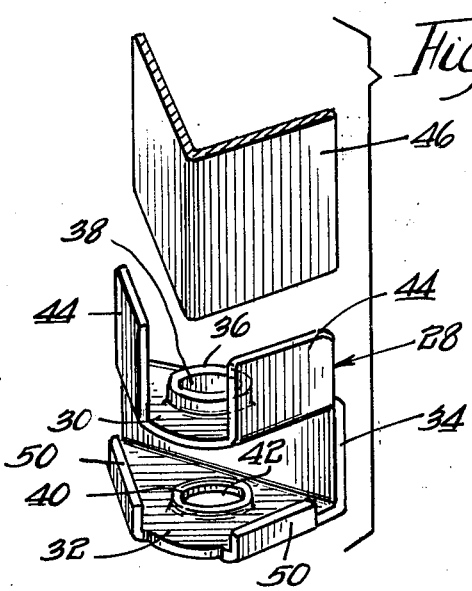
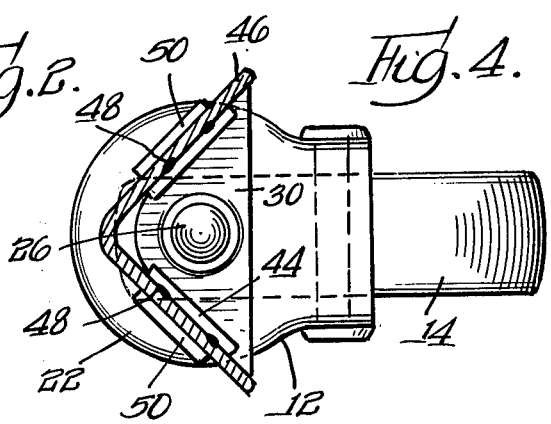
Inventor:-
Edward H. Schultz, Jr.
By: Olson, Trexler, Wolters & Bushnell
attys United States Patent Office 3,478,381
Patented Nov. 18, 1969

3,478,381
CASTER BRACKET DEVICE
Edward H. Schultz, Jr., Chicago, Ill., assignor to Nagel-Chase Manufacturing Company, Chicago, Ill., a corporation of Illinois
Filed Nov. 7, 1966, Ser. No. 592,588
Int. Cl. B60b 33/00
U.S. Cl. 16—29         6 Claims This invention relates generally to improvements in caster devices or structures of the type adapted to support vertical loads such as the weight of furniture, desks, cabinets, and other like objects. More particularly, the present invention is concerned with improvements in brackets for accommodating caster pintles.

It is well known that pintles of casters employed to support substantial weight loads are often subjected to both vertical and lateral stresses. It is a primary object of the present invention to provide a relatively inexpensive, yet sturdy, bracket which may be aligned with and attached to a supporting structure, such as the foot of a supporting leg, by the exercise of minimum skill and effort, and which will so accommodate a caster pintle that the forces resulting from the weight supported by the caster will be properly transmitted to the caster bearing.

More specifically, the invention contemplates a bracket arrangement for accommodating a conventional pintle of a caster structure which, when brought into interlocking association with the foot of a supporting leg, will automatically position weldable portions of the caster bracket in contact with complementary surface areas of the supporting leg.

Still more specifically, the invention contemplates a caster bracket arrangement as set forth above which is adapted for contemporaneous engagement and consequent alignment with the inner and outer surfaces of a supporting leg, such as the lower extremity of an angle iron.

It is a further object of the present invention to provide a caster bracket of the type referred to above for properly transmitting vertical loads to antifriction bearing races associated with the upper portion of a conventional caster accommodating yoke.

The foregoing and other objects and advantages will become more apparent from the following detailed description taken in connection with the accompanying drawings wherein:

FIG. 1 is a perspective view of a lower fragmentary portion of an angle iron supporting leg having, in association with the foot thereof, a caster bracket which is representative of one embodiment of the present invention;

FIG. 2 is an enlarged perspective, vertically exploded, view of the caster bracket and supporting foot as seen from the opposite side of FIG. 1;

FIG. 3 is an enlarged vertical sectional view of the caster and caster supporting bracket shown in FIG. 1, said section being taken substantially along the line 3—3 of FIG. 1; and FIG. 4 is an enlarged horizontal sectional view taken substantially along the line 4—4 of FIG. 3.

Referring now to the drawing more in detail, wherein like numerals have been employed to designate similar parts throughout the various figures, it will be seen that a caster structure is designated generally by the numeral 10. This caster structure includes a conventional yoke member 12 which, at its lower extremity, rotatably supports a roller or caster member 14. The upper portion of the yoke 12 supports a suitable antifriction bearing designated generally by the numeral 16. The upper transverse surface of the yoke 12 provides an annular lower ball race 18 for a plurality of circumferentially distributed balls 20 (FIG. 3). A second or upper race member 22 cooperates with the lower race 18 in retaining the balls 20 in proper load supporting position. Centrally of the race 22 is an annular bearing ferrule or extrusion 24. Extending upwardly through a central aperture in the race 18 and the aperture defined by the extruded collar or ferrule 24 is a caster pintle 26. This pintle 26 is preferably secured as a unit with the race 22, the lower extremity of the pintle 26 extending through and peened against the under side of the race 18. The specific arrangement of the ball-bearing races does not form a part of the present invention except as such structures might enter into the combination with a novel caster bracket 28 about to be described.

This bracket member 28 is shown in detail in the exploded view of FIG. 2 and is preferably formed from a single piece of sheet metal. It will be noted that the bracket 28 comprises an upper plate-like bracket section 30 and a lower plate-like bracket section 32, said sections 30 and 32 being maintained in predetermined vertically spaced relation by an integral spacer bracket section 34. The upper and lower margins of the spacer section 34 are joined respectively with the upper, substantially horizontal, bracket section 30, and the lower, substantially horizontal, bracket section 32.

A ferrule or extruded bearing collar 36 is formed centrally of the bracket section or plate 30, and defines a pintle accommodating aperture 38. A similar ferrule or upstanding extruded collar 40 on the bracket section 32 defines a pintle accommodating aperture 42 which is located in axial alignment with the upper aperture 38. Both the bracket section 30 and the bracket section 32, in the disclosed embodiment, are substantially triangular or polygonal in shape. Extending upwardly along the opposite angularly disposed margins of the bracket section 30 is a pair of weldable flange elements 44. These flanges 44 are positioned in vertical planes which are substantially normal to each other, and therefore are in a position to be received by the inner complementary surfaces of the foot portion of an angle iron or leg member 46 as clearly shown in FIGS. 1 and 3. In this position, the flanges 44 are adapted to be spot-welded, as at 48, to the complementary inner surface areas of the angle iron 46.

A very simple structure, in the form of upstanding flanges 50 formed integral with the horizontal bracket section 32, is employed to automatically and expeditiously align the caster bracket 28 with the foot of the angle iron leg 46. It will be understood that the flanges 50 extend vertically with respect to the plane of the bracket section or plate 32, and also extend at substantially right angles with respect to each other. These flanges 50 are coincident with vertical planes spaced radially outwardly with respect to the planes of the weldable flanges 44 a sufficient amount to permit the association of the outer surfaces of the flanges 44 with the inner complementary wall surface of the angle iron leg 46 and the inner surfaces of the flanges 50 with the complementary outer surfaces at the bottom of the angle iron leg. When the bracket is thus moved into operative interlocking association with the lower end of the angle iron leg 46, the upper and lower bracket apertures 38 and 42 respectively are positioned in vertical alignment. After being thus located, the flanges 44 may be welded at the points 48 to the angle iron leg 46. Thus the flange members or means associated with the lower bracket section 32 engage the outer surfaces of the angle iron 46 so as to prevent lateral displacement of the bracket 28 in one direction, and the outer surfaces of the flanges 44 engage the complementary inner surfaces of the angle iron leg 46 to prevent lateral displacement of the bracket in the opposite direction. Once the flanges 44 become permanently welded in position, the aforesaid apertures 38 and 42 are in position to accommodate the pintle 26.

From FIG. 3 it will be seen that the under side of the ferrule 40 provides a bearing surface for accommodating the upper edge of the ferrule 24 of the race member 22. Hence vertical loads from the supporting leg 46 are transmitted to the antifriction bearing 16 along an annular area defined by the engaging surfaces of the ferrules or collars 24 and 40. This results in concentrating the vertical forces from the caster bracket 28 along a restricted annular area defined by the engaging surfaces of the ferrules 24 and 40.

The upper ferrule 36 functions to withstand lateral stresses experienced by the upper portion of the pintle 26, while the bottom surface of the bracket section 32 along the under side of the ferrule 40 provides a bearing adapted to take up both lateral and vertical stresses. Both the upper and lower bracket sections 30 and 32, respectively, serve as strut elements extending between the right angularly disposed inner surfaces of the supporting legs 46 after the flanges 50 have been properly interlocked with the outer bottom margins of the angle iron and the upper flanges 44 have been welded in place. As previously pointed out, the interlock or engagement of the upstanding flanges 50 with the outer surfaces of the angle iron leg assures absolute alignment in the initial positioning of the bracket member, and finally provides a firm support against forces tending to displace the bracket laterally.

It will be apparent from the foregoing description that the improved simple pintle-accommodating bracket 28 may be interlocked with the lower end of the leg support with a minimum amount of effort and skill, and precludes the necessity for employing auxiliary gauges and the like for properly positioning the weldable flanges. The caster bracket contemplated by the present invention makes it possible to carry heavy weights without the slightest tendency for the caster pintle to be subjected to forces tending to distort it. Both lateral and vertical forces are resisted in such a manner as to preclude deformation of any portions of the caster structure under unusually heavy load conditions. Obviously other forms of antifriction type bearings may be associated with the caster yoke 12 without affecting the functional and structural characteristics of the caster bracket. Furthermore, the caster bracket is not limited for use with the specific arrangement of the supporting leg, but is capable of application in any instance where the upstanding flange members may be employed to engage complementary surface areas of the leg structure as and for the purpose set forth herein.

While for purposes of illustration certain structural details have been disclosed and described herein, it should be understood that the present invention contemplates other modifications and changes without departing from the spirit and scope of the appended claims.

What is claimed is:

1. A workpiece supporting bracket structure for accommodating a caster pintle including an upper, substantially horizontal bracket plate section apertured to telescopically accommodate the upper extremity of a caster pintle, a lower substantially horizontal bracket plate section spaced vertically from said upper section and having a pintle accommodating aperture disposed coaxially with respect to the aperture of the upper bracket section, a spacer bracket section for maintaining said upper and lower bracket plate sections in predetermined spaced relation, marginal, axially extending weldable flange means on said upper bracket plate section, and bracket locating marginal, axially extending flange means on said lower bracket section, positioned radially outwardly of a vertical plane coincident with said weldable flange means, whereby to enable unencumbered peripheral exposure of the outer surface of a supported workpiece in the vicinity of said weldable flange means.

2. A bracket structure for accommodating a caster pintle as set forth in claim 1 wherein the apertures in the upper and lower bracket plate sections are defined by pintle accommodating ferrules extending axially upwardly therefrom.

3. A bracket structure for accommodating a caster pintle as set forth in claim 1 wherein the weldable flange means is located along the outer periphery of the upper bracket section and extends vertically upwardly therefrom.

4. A bracket structure for accommodating a caster pintle as set forth in claim 3 wherein the weldable flange means comprises a pair of substantially vertical flange members disposed at substantially right angles to each other.

5. A bracket structure for accommodating a caster pintle as set forth in claim 1, wherein said upper and lower bracket sections comprise plate-like elements of polygonal shape, and the spacer bracket section extends between adjacent margins of said plate-like members.

6. A bracket structure for accommodating a caster pintle including an upper, substantially horizontal bracket section in the form of polygonally shaped plate apertures to telescopically accommodate the upper extremity of a caster pintle, a lower substantially horizontal bracket section in the form of a polygonally shaped plate spaced vertically from said upper section and having a pintle accommodating aperture disposed coaxially with respect to the aperture of the upper bracket section, the apertures in each of said bracket sections being defined by pintle accommodating ferrules, a spaced bracket section extending between adjacent margins of said upper and lower bracket sections to maintain the same in predetermined spaced relation, weldable flange elements extending vertically from the margin of said upper section, and bracket locating flange members extending vertically from the margin of said lower bracket section, the flange members of the upper bracket section being disposed at substantially right angles to each other, and the flange members on the lower bracket section extending at substantially right angles with respect to each other and spaced radially outwardly from vertical planes defined by the flange members of the upper bracket section.

References Cited

UNITED STATES PATENTS

| 1,468,293 | 9/1923 | Herold | 16—31 |
| 3,277,513 | 10/1966 | Schultz | 16—31 |

BOBBY R. GAY, Primary Examiner

D. L. TROUTMAN, Assistant Examiner

U.S. Cl. X.R.

16—31